(12) United States Patent
Lee et al.

(10) Patent No.: US 11,772,554 B2
(45) Date of Patent: Oct. 3, 2023

(54) METHOD OF PROVIDING VIRTUAL SOUND IN ELECTRIC VEHICLE

(71) Applicants: Hyundai Motor Company, Seoul (KR); Kia Corporation, Seoul (KR)

(72) Inventors: Jin Sung Lee, Gyeonggi-do (KR); Ki Chang Kim, Gyeonggi-do (KR); Dong Chul Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/399,627

(22) Filed: Aug. 11, 2021

(65) Prior Publication Data
US 2022/0169174 A1 Jun. 2, 2022

(30) Foreign Application Priority Data

Dec. 1, 2020 (KR) ........................ 10-2020-0165380

(51) Int. Cl.
*B60Q 5/00* (2006.01)
*B60R 11/02* (2006.01)
*H04R 3/00* (2006.01)
*B60R 11/00* (2006.01)

(52) U.S. Cl.
CPC .......... *B60Q 5/005* (2013.01); *B60R 11/0217* (2013.01); *H04R 3/00* (2013.01); *B60R 2011/004* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 7,979,147 B1 | 7/2011 | Dunn | |
| 9,426,552 B2* | 8/2016 | Pommerer | H04R 1/028 |
| 2011/0010269 A1* | 1/2011 | Ballard | G06Q 30/0601 |
| | | | 705/26.1 |
| 2012/0232769 A1 | 9/2012 | Nyu et al. | |

(Continued)

FOREIGN PATENT DOCUMENTS

| | | |
|---|---|---|
| DE | 102014204404 A1 | 9/2015 |
| JP | 2011215436 A | 10/2011 |
| KR | 101388621 B1 * 4/2014 | ........ H01M 10/613 |

(Continued)

OTHER PUBLICATIONS

English language translation of KR101388621B1.*

*Primary Examiner* — Paul W Huber
(74) *Attorney, Agent, or Firm* — Fox Rothschild LLP (57) ABSTRACT

A method of providing virtual sound in an electric vehicle, includes: collecting vehicle driving information for outputting the virtual sound; determining characteristics of the virtual sound based on the collected vehicle driving information; generating a virtual effect signal for outputting the virtual sound, based on the determined characteristics; generating a sound signal containing the characteristics, based on the virtual effect signal; collecting the generated sound signal to obtain a final sound signal corresponding to a vehicle rating selected according to setting information based on the preset vehicle rating and a sound correction algorithm; and outputting the virtual sound corresponding to the selected vehicle rating, according to the final sound signal.

11 Claims, 7 Drawing Sheets

(56) References Cited

U.S. PATENT DOCUMENTS

2015/0199955 A1\* 7/2015 Draganic .............. G10K 15/02
 381/86
2019/0111839 A1 4/2019 Lee et al.

FOREIGN PATENT DOCUMENTS

| KR | 101848779 B1 | 4/2018 |
| KR | 101926990 B1 | 12/2018 |
| KR | 101947317 B1 | 2/2019 |
| KR | 2019-0051451 A | 5/2019 |

\* cited by examiner

METHOD OF PROVIDING VIRTUAL SOUND IN ELECTRIC VEHICLE

CROSS REFERENCE TO RELATED APPLICATION

The present application claims under 35 U.S.C. § 119(a) the benefit of Korean Patent Application No. 10-2020-0165380, filed Dec. 1, 2020, the entire contents of which are incorporated by reference herein.

BACKGROUND

(a) Technical Field

The present disclosure relates to a method of providing virtual sound in an electric vehicle, more particularly, to the method of providing virtual sound that is capable of generating and reproducing virtual sound in the electric vehicle.

(b) Description of the Related Art

As is well known, electric vehicles (EV) are vehicles that utilize a motor as a power source. A drive system of a typical electric vehicle includes a battery, an inverter, the motor, and a decelerator. The battery supplies power for driving the motor. The inverter is connected to the battery and drives and controls the motor. The motor, as the drive source for the electric vehicle, is connected to the battery through the inverter in a manner that is chargeable and dischargeable. The decelerator decelerates a rotational force of the motor and transfers the resulting rotational force to a driving wheel.

When driving the motor, the inverter converts DC current supplied from the battery to AC current and applies the resulting AC current to the motor through a power cable. When generating regenerative power through the motor, the inverter converts the AC current generated by the motor into the DC current, then supplies the resulting DC current to the battery, and charges the battery.

Unlike an existing conventional vehicle equipped with an internal combustion engine, the typical electric vehicle does not use a multi-step transmission. Instead, the decelerator is arranged between the motor and the driving wheel. The internal combustion engine has a wide distribution range of energy efficiency according to an operating point and provides a large torque only in a high speed region. In contrast, in the motor, a difference in efficiency with respect to an operating point is relatively small, and a high torque at a low speed can be produced only with characteristics of a single motor. For this reason, the decelerator is provided instead of the multi-step transmission.

In addition, the existing conventional vehicle equipped with the internal combustion engine requires a starting mechanism, such as a torque converter or a clutch, because low-speed driving is impossible with the internal combustion engine. However, in a drive system of the electric vehicle, it is possible to drive the motor at a low speed. For this reason, the electric vehicle does not require the starting mechanism. Because of this mechanical difference, unlike the internal combustion engine vehicle, the electric vehicle provides smooth driving without discontinuous driving interruption due to gear shifting.

In this manner, unlike the existing vehicle equipped with the internal combustion engine that combusts fuel to generate a motive power, the drive system of the electric vehicle generates the motive power by driving the motor with electric power of the battery. Therefore, generally, a torque produced in the electric vehicle is more modest, smoother, and more responsive than a torque produced in the internal combustion engine through aerodynamic and thermodynamic reactions.

These characteristics are favorable advantages of the electric vehicle. However, in the case of high-performance vehicles, noise and physical vibration of the internal combustion engine and various effects generated due to thermodynamic action therein may be recognized as factors for realizing a sporty feel. For example, one of the elements that cannot be provided by the drive system of the electric vehicle because of the characteristics thereof is an after-burn sound that is frequently heard in a high-performance vehicle equipped with the internal combustion engine.

The after-burn sound is sound generated due to a change in pressure in an exhaust system of the internal combustion engine. In the high-performance vehicle or the like, the after-burn sound is generated when compressed fuel is discharged through an exhaust manifold without having been ignited in a cylinder of the engine for various reasons and then is expanded within a high-temperature exhaust pipe. Because of the after-burn sound, occupants of the electric vehicle, including a driver, may wish to experience a sporty sensation in the electric vehicle.

In recent years, electric vehicles have been widely used. Accordingly, there is an increasing number of drivers who want to realize a sporty sensation and have various types of driving fun in the electric vehicle in the same manner as in the internal combustion engine vehicle. Accordingly, technologies that can virtually generate and provide sound generated in a drive system other than the drive system of the electric vehicle, so as to mimic the engine sound and the after-burn sound of the internal combustion engine vehicle, in the electric vehicle are required. Particularly, technologies that can provide virtual sound differentiated based on vehicle rating in the electric vehicle are required.

The foregoing is intended merely to aid in the understanding of the background of the present disclosure, and is not intended to mean that the present disclosure falls within the purview of the related art that is already known to those skilled in the art.

SUMMARY

Therefore, an objective of the present disclosure is to provide a method of outputting virtual sound in such a manner that a driver can realize a sporty feel and have various types of driving fun in the electric vehicle.

Another objective of the present disclosure is to provide a method of virtually generating sound generated in a drive system other than a drive system of an electric vehicle, so as to mimic an engine sound and an after-burn sound of an internal combustion engine vehicle, in the electric vehicle.

Still another of the present disclosure is to provide a method of providing differentiated virtual sound based on vehicle rating in an electric vehicle.

According to an aspect of the present disclosure, there is provided a method of providing virtual sound in an electric vehicle, the method including: collecting, by a control unit, vehicle driving information for outputting the virtual sound, while the electric vehicle is traveling; determining the control unit, characteristics of the virtual sound based on the collected vehicle driving information; generating, by the control unit, a virtual effect signal for outputting the virtual sound, based on information on the determined characteristics of the virtual sound; generating, by an audio device, a sound signal containing the characteristics of the virtual sound, based on the virtual effect signal that is input from the control unit; correcting, by the audio device, the generated sound signal to obtain a final sound signal corresponding to a vehicle rating that is selected by a driver according to setting information based on the preset vehicle rating and a sound correction algorithm; and outputting by the audio device, the virtual sound corresponding to the selected vehicle rating, according to the final sound signal resulting from the correction.

With the method of providing virtual sound in an electric vehicle according to the present disclosure, the virtual sound can be output and provided in such a manner that, in the electric vehicle, a driver enjoys a differentiated emotional driving experience and has various types of driving fun. In addition, in the same manner as an after-burn sound in an internal combustion engine vehicle, sound generated in a drive system other than an electric vehicle drive system is virtually output and provided in the electric vehicle. In addition, the virtual sound differentiated based on the vehicle rating is provided in the virtual sound.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Embodiments of the present disclosure will be only described illustratively below in terms of specific structures and functions. Various embodiments are conceivable without departing from the nature and gist of the present disclosure. The present disclosure should not be construed as being limited to embodiments described in the present specification. All alterations, equivalents, and substitutes that are included within the technical idea of the present disclosure should be understood as falling within the scope of the present disclosure.

In the present specification, the terms first, second, and so on are used to describe various constituent elements, but these elements are not limited to those terms. Those terms are only used to distinguish one constituent element from another. For instance, a first constituent element may be termed a second constituent element without departing from the scope of each claim that defines the present disclosure. Likewise, the second constituent element may also be termed the first constituent element.

It should be understood that, when a constituent element is referred to as being "coupled to" or "connected to" a different constituent element, this means that the constituent element may be coupled to or connected to the different constituent element or means that an intervening constituent element may be present therebetween. In contrast, it should be understood that, when a constituent element is referred to as being "directly coupled to" or "directly connected to" a different constituent element, this means that no intervening constituent element is present therebetween. Expressions for describing a relationship between constituent elements, such as "between" and "directly between", and "adjacent to" and "directly adjacent to", should be construed in the same manner.

Like reference numerals depict like constituent elements throughout the present specification. The terms throughout the present specification are used for describing embodiments and do not impose any limitation on the present disclosure. Unless specified otherwise through the present specification in a phrase or a sentence, words expressed in the singular include the plural.

Embodiments of the present disclosure will be described below with reference to the accompanying drawings.

The present disclosure relates to a method of providing virtual sound. The method is capable of providing the virtual sound in such a manner that a driver realizes a sporty feel and has various types of driving fun in an electric vehicle. In addition, the present disclosure relates to a method capable of virtually generating and outputting sound, generated in a drive system other than an electric vehicle drive system, such as an engine sound or an after-burn sound of an internal combustion engine vehicle, in the electric vehicle. Particularly, the present disclosure relates to a method of providing virtual sound differentiated based on a vehicle rating in the electric vehicle.

According to the present disclosure, the virtual sound that is intended to be provided may be a motor sound that is generated in a motor that is a drive apparatus (power generation apparatus) of the electric vehicle, while the electric vehicle is traveling. The motor sound here is virtual motor sound, not actual motor noise, and is virtual vehicle-traveling sound of the motor, which is recognized as if it were generated in the motor according to an electric vehicle driving condition.

Alternatively, according to the present disclosure, the virtual sound that is intended to be provided may be an engine sound that is generated in a drive system other than the electric vehicle drive system, for example, in an engine that is a drive apparatus (power generation apparatus) of an internal combustion engine vehicle, while the electric vehicle is traveling. Because the electric vehicle does not have an engine, the engine sound is also virtual engine sound, not actual noise of the engine, and is virtual vehicle-traveling sound of the engine, which is recognized as if it were generated in the electric vehicle according to the vehicle driving condition.

Alternatively, according to the present disclosure, the virtual sound that is intended to be provided, as described above, may be an after-burn sound that is generated in the internal combustion engine vehicle, not normal engine sound. Because the electric vehicle does not have an internal combustion engine, the after-burn sound in an exhaust system cannot be generated. However, according to the present disclosure, virtual sound resulting from simulating the after-burn sound generated in the exhaust system of the internal combustion engine is generated, output, and provided in the electric vehicle.

The virtual vehicle-traveling sound, that is, virtual motor sound or virtual engine sound, which belongs to the virtual sound is categorized into acceleration sound and deceleration sound in accordance with a driver's operation of an acceleration pedal. When an operation of applying pressure to the acceleration pedal is performed, the acceleration sound is set to be output. When performing an operation of releasing the pressure applied to the acceleration pedal, the deceleration sound is set to be output.

According to the present disclosure, the virtual sound that is intended to be provided is generated and output through an audio device of the electric vehicle. At this point, the audio device that generates and outputs the virtual sound includes a digital signal processor (DSP), an amplifier, and one or more speakers.

The method of providing the virtual sound according to the present disclosure is configured in such a manner that the virtual sound differentiated based on the vehicle rating is output through the audio device. The vehicle rating here means a vehicle grade that is classified and defined based on at least one of the size and weight of the vehicle, the size and output capacity of the power generation apparatus, the number of cylinders and displacement of the engine, or the presence or absence of a turbocharger.

The method of providing the virtual sound according to an embodiment of the present disclosure will be described below, taking an example where a virtual after-burn sound differentiated based on the vehicle rating is generated and output in the electric vehicle. The example of providing the virtual after-burn sound will be described below. However, it is possible that the virtual after-burn sound is generated, output, and provided along with the virtual engine sound. That is, according to the present disclosure, the virtual sound that is intended to be provided while the electric vehicle is traveling includes the virtual after-burn sound resulting from simulating the after-burn sound generated in the exhaust system of the vehicle equipped with the internal combustion engine, and the virtual engine sound resulting from simulating the engine sound that is generated in the engine of the internal combustion engine vehicle. Alternatively, according to the present disclosure, the virtual sound includes the virtual motor sound instead of the virtual after-burn sound and the virtual engine sound.

The after-burn sound in the well-known internal combustion engine vehicle is exhaust sound that is occasionally generated in the rear of the internal combustion engine vehicle that is traveling. Normally, the engine (internal combustion engine) is mounted in the front of the internal combustion engine vehicle. Thus, the engine sound in the internal combustion engine vehicle is noise that is generated in the front of the internal combustion engine vehicle that is traveling. Therefore, according to the present disclosure, the virtual after-burn sound is set to be output through a speaker installed on the rear side of the electric vehicle, and the virtual engine sound are set to be output through a speaker mounted on the front side of the electric vehicle.

According to the present disclosure, the virtual sound is generated and output according to the vehicle driving condition. The electric vehicle is not equipped with an internal combustion engine having an intake system and an exhaust system. However, according to the present disclosure, when a control unit generates an after-burn signal containing characteristics of the virtual after-burn sound using driving variable information for the electric vehicle, the virtual after-burn sound in accordance with the generated after-burn signal is output through the audio device. At this point, in order to differentiate the virtual after-burn sound, which is to be output, based on the vehicle rating, as will be described below, a correction process of additionally adjusting a frequency or sound pressure is performed on a sound signal based on the vehicle rating. The virtual after-burn sound differentiated based on the vehicle rating is accordingly output through the audio device.

Figure 1:
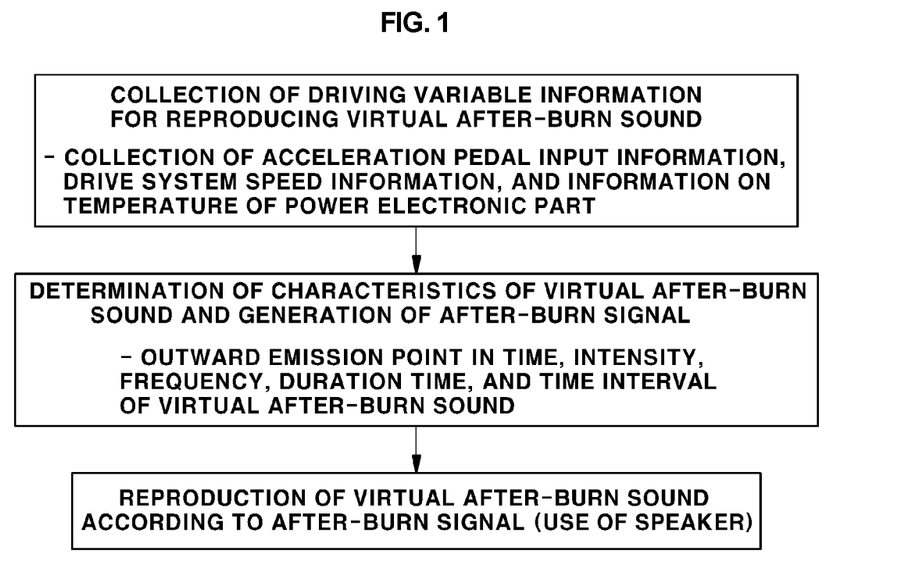
FIG. 1 is a block diagram illustrating a method of providing a virtual after-burn sound according to an embodiment of the present disclosure.

FIG. 1 is a block diagram illustrating the method of providing the virtual sound according to the embodiment of the present disclosure. According to the present disclosure, when the virtual after-burn sound is output, a virtual vibration of the internal combustion engine is produced in order for the driver to realize a sporty sensation. At this point, a motor is used to produce the virtual vibration of the internal combustion engine. The motor that will be described below, which is used to produce the virtual vibration of the internal combustion engine, is a drive motor connected to a driving wheel to drive the electric vehicle. From the following description, it would be understood by a person of ordinary skill in the art that the internal combustion engine and the engine are interchangeably used to mean the same thing.

According to the present disclosure, the driving variable information for outputting the virtual after-burn sound is collected in real time in the electric vehicle while the electric vehicle is traveling. The after-burn signal containing the characteristics of the virtual after-burn sound is generated in real time based on the collected driving variable information. Then, the virtual after-burn sound is generated in and output from the audio device according to the generated after-burn signal (a sound effect is implemented).

According to the present disclosure, the driving variable information, which is input into the control unit and is used to output the virtual after-burn sound and produce the illusion thereof is information on an actual system installed in the electric vehicle and is real-time vehicle driving information in the electric vehicle. In addition, the vehicle driving information may include actual driver input information and actual driving state information in the electric vehicle.

The vehicle driving information may be sensor measurement information that is sensed by a sensor and is input through a vehicle network, be information that is autonomously determined by a control unit according to the present disclosure, or be information that is input from another control unit within the electric vehicle into the control unit according to the present disclosure through the vehicle network.

Specifically, the vehicle driving information for outputting the after-burn sound and producing the illusion thereof includes at least one or more of an acceleration pedal input value (APS value), a motor torque (a motor torque command), a drive system speed, and temperature of a power electronic part. The acceleration pedal input value is the driver input information. The motor torque, the drive system speed, and the temperature of the power electronic part are the driving state information. Moreover, the vehicle driving information may further include at least one or more of a change ratio (a change gradient) of an acceleration pedal input value, an integral value of the acceleration pedal input value, a change ratio (a change gradient) of the motor torque, and an integral value of the motor torque. The change ratio of the acceleration pedal input value and the integral value of the acceleration pedal input value are the driver input information. The change ratio of the motor torque and the integral value of the motor torque are the driving state information.

The acceleration pedal input value here is determined in accordance with the driver's operation of the acceleration pedal and, as will be described below, is information measured by an acceleration-pedal measurement unit. The change ratio of the acceleration pedal input value means a change gradient of the acceleration pedal input value and is obtained by calculating a gradient of accelerator position sensor (APS) signal.

The motor torque is the motor torque command (a basic torque command that will be described below) that is determined by the control unit based on the vehicle driving information collected in the electric vehicle. In addition, the change ratio of the motor torque means a change gradient of the motor torque command. A method in which the motor torque command for controlling a torque output of the drive motor is determined and generated in the electric vehicle, and steps of the method are well known in the art to which the present disclosure pertains, and thus detailed description thereof are omitted.

The drive system speed information is at least one of a speed or an acceleration. The speed is a rotational speed of a vehicle drive-system part, that is, a speed of the motor, a wheel speed of the driving wheel (a rotational speed of the driving wheel), or a speed of a drive shaft. In addition, the acceleration is a rotational acceleration of the motor, the driving wheel, or the drive shaft. The acceleration may be obtained by differentiating a signal of the speed of the motor, a signal of the wheel speed, or a signal of the speed of the drive shaft and may be an actual measurement value sensed by an acceleration sensor.

In addition, according to an embodiment of the present disclosure, a virtual engine speed that is a virtual variable may be used as the drive system speed information for virtual sound output. The virtual engine speed is a virtual speed that is determined by the control unit from the driving variable information. According to an embodiment of the present disclosure, a preset virtual internal combustion engine model is used to acquire the virtual engine speed from the driving variable information in the electric vehicle.

According to an embodiment of the present disclosure, when the virtual internal combustion engine model including a virtual engine and a virtual transmission is used, the virtual engine speed is an input speed of the virtual transmission. The virtual engine speed is calculated as a variable value that is a multiple of the drive system speed measured by a speed measurement unit. The drive system speed here is the motor speed. At this point, a value of a coefficient by which the motor speed is multiplied to calculate the virtual engine speed is a value that is determined, depending on a virtual transmission, a virtual gear-ratio model, and a virtual current gear position.

Control methods for creating the feeling of virtual gear shift in the electric vehicle have been known. In the control methods, the feeling of multi-step gear shift is created and experienced through torque control the drive motor in the electric vehicle not equipped with a multi-step transmission. In addition, it has been known that the virtual engine speed is used as one of the virtual variables necessary to create and experience the feeling of multi-step gear shift in a control process for creating the feeling of virtual gear shift in the electric vehicle.

In this manner, according to the present disclosure, the virtual engine speed, one of the virtual variables used to create and experience the feeling of multi-step gear shift, is used as the virtual variable for the virtual sound output. According to an embodiment of the present disclosure, a virtual effect implementation controller determines a virtual vehicle speed using a virtual vehicle speed and information on a gear ratio for a virtual current gear position.

The virtual vehicle speed here is calculated as a value in direct proportional to an actual motor speed, using the actual motor speed, which is a speed included in the actual variable (input variable) information, and a virtual final reduction gear ratio. The virtual final reduction gear ratio here is a value that is preset to be in the virtual effect implementation controller. According to an embodiment of the present disclosure, the virtual vehicle speed is calculated using the actual motor speed, which is measured while the electric vehicle is traveling, and the virtual final reduction gear ratio, and the virtual engine speed is calculated in real time with the calculated virtual vehicle speed.

At this point, the virtual engine speed is obtained from a value resulting from multiplying the virtual vehicle speed and a virtual gear ratio for the virtual current gear position together. Alternatively, the virtual engine speed may be obtained from a value resulting from multiplying the drive system speed, such as the motor speed, and the virtual gear ratio for the virtual current gear position together.

In addition, the virtual current gear position is determined from the virtual vehicle speed and the acceleration pedal input value (APS value) according to a gear shift schedule map that is preset to be in the virtual effect implementation controller. When the virtual current gear position is determined as described above, the virtual engine speed is calculated in real time using the virtual gear ratio and the virtual vehicle speed that correspond to the determined virtual current gear position, or using the motor speed.

When the virtual current gear position is determined from the virtual vehicle speed and the acceleration pedal input value, as described above, the virtual engine speed is calculated based on information on the determined virtual current gear position. At this point, the virtual sound is generated in the electric vehicle based on the calculated virtual engine speed information. The gear position information determined from the virtual vehicle speed and the acceleration pedal input value is used in this manner. However, instead of the above-mentioned gear position, a gear position that is selected when the driver performs a gear shift operation using a gear shift unit, such as a shift lever, may be used to generate the virtual sound.

The temperature of the power electronic part (PE part) is temperature sensed by a temperature sensor. The power electronic part here means a power electronic part of the electric vehicle, such as a drive system part. According to the present disclosure, the temperature of the power electronic part is the temperature of the motor, temperature of a battery, or temperature of a power electronic part other than the motor and the battery, for example, an inverter. Alternatively, the temperature of the power electronic part may be temperature of a drive system part of another vehicle.

In the electric vehicle, in order to cool power electronic (PE) parts, such as the motor, the battery, and the inverter, a water cooling system circulating a coolant between each of the power electronic parts and a radiator is used. The temperature of the power electronic part is the temperature of the coolant, which is sensed by the temperature sensor.

According to the present disclosure, the control unit determines the characteristics of the virtual after-burn sound using the vehicle driving information that is actual driving variable information in the electric vehicle, or using the virtual engine speed, which is virtual variable information, in addition to the vehicle driving information. The characteristics here of the virtual after-burn sound include an outward emittance point in time that is a point in time at which the virtual after-burn sound is output through the audio device. Additionally, the characteristics of the virtual after-burn sound may further include at least one or more of the intensity, a duration time, a time interval, a frequency band, and a pitch indicating the degree of highness or lowness of tone, of sound resulting from simulating the after-burn sound. The intensity of the virtual after-burn sound means a volume of sound.

When the characteristics of the virtual after-burn sound are determined in this manner, the control unit generates the after-burn signal based on the determined characteristics of the virtual after-burn sound and controls operation of the audio device in such a manner that the virtual after-burn sound is output according to the generated after-burn signal.

When, as described above, the control unit acquires the virtual variable information in the internal combustion engine from the actual driving variable information in the electric vehicle, the virtual internal combustion engine model that is preset to be in the control unit and is stored therein is used as described above.

Figure 2:
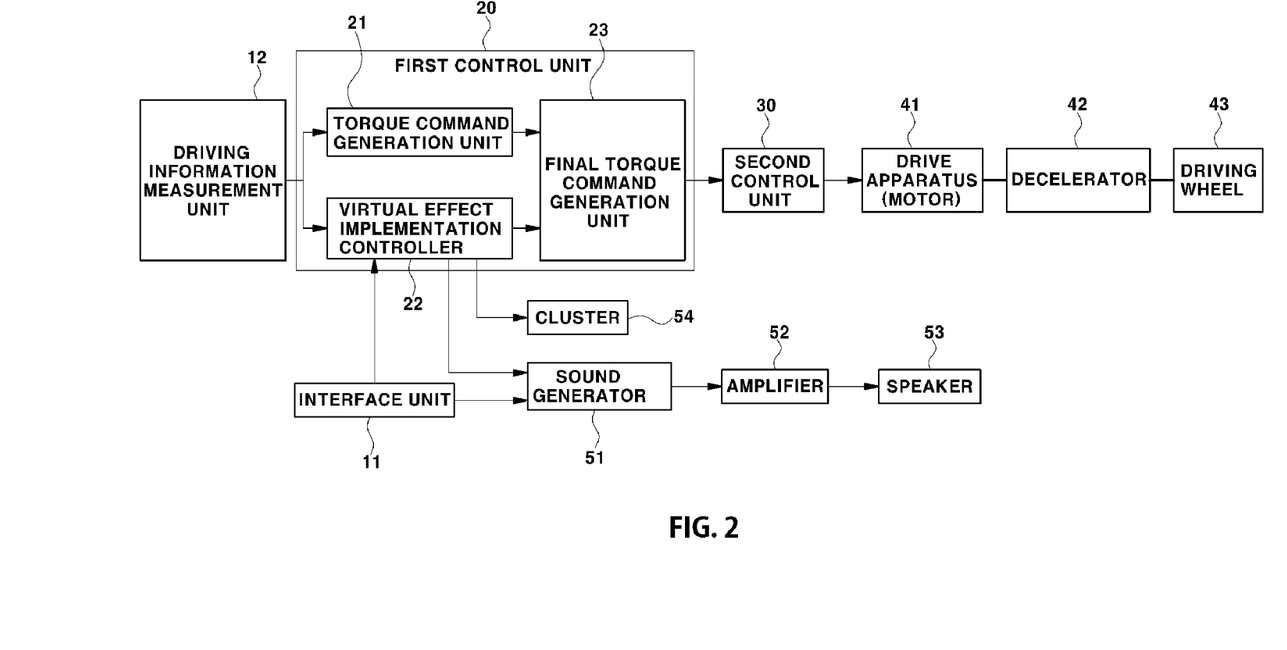
FIG. 2 is a block diagram illustrating a configuration of a device for providing the virtual after-burn sound according to an embodiment of the present disclosure.
Figure 3:
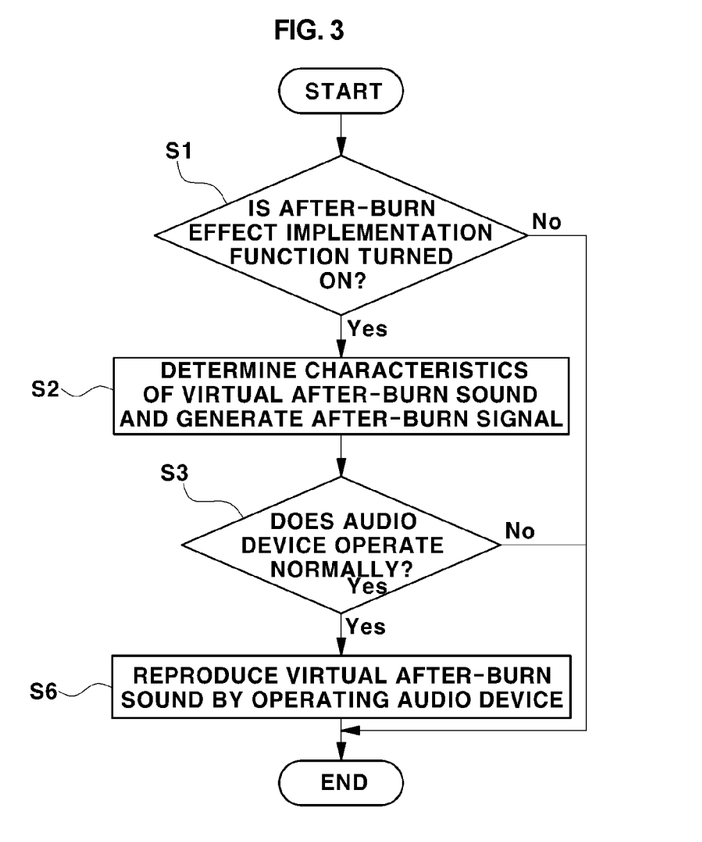
FIG. 3 is a flowchart illustrating a process of providing the virtual after-burn sound according to an embodiment of the present disclosure.

FIG. 2 is a block diagram illustrating a configuration of a device for providing the virtual sound according to an embodiment of the present disclosure. FIG. 3 is a flowchart illustrating a process of providing the virtual sound according to an embodiment of the present disclosure.

As illustrated in FIG. 2, the device for providing the virtual sound according to the embodiment of the present disclosure includes a driving information measurement unit 12, a first control unit 20, and an audio device. The driving information measurement unit 12 measures the vehicle driving information. The first control unit 20 determines the characteristics of the virtual after-burn sound based on the vehicle driving information measured by the driving information measurement unit 12 and then generates and outputs the after-burn signal for outputting the virtual after-burn sound, according to the determined characteristics of the virtual after-burn sound. The audio device operates to output the virtual after-burn sound according to the after-burn signal that is output from the first control unit 20.

The audio device here includes a sound generator 51, an amplifier 52, and a speaker 53, such as a woofer. The sound generator 51 outputs the sound signal for processing a sound source signal and the after-burn signal and generating sound. The amplifier 52 operates according to the sound signal and outputs the virtual after-burn sound. The speaker 53 is installed inside or outside the electric vehicle, or both inside and outside the electric vehicle. Preferably, a plurality of speakers 53 are installed in the electric vehicle and are used to output the virtual after-burn sound.

In addition, according to the present disclosure, the first control unit 20 generates and outputs the torque command based on the vehicle driving information. Accordingly, a second control unit 30 controls operation of a drive apparatus 41 according to the torque command that is output by the first control unit 20. Here, the drive apparatus 41 may be a drive motor. The first control unit 20 and the second control unit 30 are involved in a control process for the virtual sound output and implementation of other virtual effects in the electric vehicle and a vehicle-traveling control process, respectively. The first control unit 20 and the second control unit 30 will be described below as performing control independently of each other. However, the control process for the virtual sound output and the vehicle-traveling control process in the electric vehicle according to the present disclosure may be performed by one integrated control constituent element instead of a plurality of control units.

The plurality of control units and the integrated control constituent element are collectively referred to as a control unit. This control unit performs the control process for the virtual sound output according to the present disclosure, which will be described below. In this case, the first control unit 20 and the second control unit 30 are collectively referred to as the control unit.

Additionally, the device for providing the virtual sound according to the present disclosure may further include an interface unit 11. Through the interface unit 11, as an input operation, the driver selectively turns on or off a virtual effect implementation function including a virtual sound output function.

Any device through which the driver can turn on or off the virtual sound output function in the electric vehicle may be used as the interface unit 11. Examples of such a device include an operation device, such as a button or a switch, which is provided in the vehicle, an input device and a touch screen of an audio, video, and navigation (ANV) system, and the like.

The interface unit 11 is connected to the first control unit 20. In particular, the interface unit 11 is connected to a virtual effect implementation controller 22, which will be described, of the first control unit 20. Accordingly, when the driver performs a turning-on or turning-off operation through the interface unit 11, a turning-on signal or a turning-off signal transmitted from the interface unit 11 is input into the virtual effect implementation controller 22 of the first control unit 20. As a result, the virtual effect implementation controller 22 of the first control unit 20 recognizes whether the driver turns on or off the virtual effect implementation function (including a virtual after-burn sound output function) (refer to step S1 in FIG. 3).

According to the present disclosure, the virtual sound output function in which the virtual sound in the internal combustion engine is output using the audio device including the sound generator 51, the amplifier 52, and the speaker 53 while the electric vehicle is traveling is performed only when, as the input operation, the driver turns on the virtual effect implementation function through the interface unit 11. In addition, if the interface unit 11 is a vehicle input device provided within the electric vehicle, through a mobile device that is another example of the interface unit 11, the operator can also perform an operation of turning on or off a virtual after-burn effect implementation function. The mobile device needs to be capable of being communicatively connected to a device within the electric vehicle, for example, the first control unit 20. To this end, an input and output communication interface for establishing a communication connection between the mobile device and the first control unit 20 is used.

According to the present disclosure, as illustrated in FIG. 2, the interface unit 11 is also connected to the sound generator 51 of the audio device. As will be described below, accordingly, it is possible that, through the interface unit 11, the driver selects the vehicle rating or adjusts a volume, a tone, and the like of the virtual sound. That is, when the driver selects the desired vehicle rating through the interface unit 11, the virtual sound corresponding to the vehicle rating selected by the driver is output from the audio device. With the operation through the interface unit 11, the volume, tone, and the like of the virtual sound are adjusted.

The driving information measurement unit 12 is a constituent that, in the electric vehicle, measures the vehicle driving information (the driving variable information) necessary to perform the virtual sound output function, along with the vehicle driving information necessary to generate the basic torque command. According to the present disclosure, the driving information measurement unit 12 includes the acceleration-pedal measurement unit, the speed measurement unit, and a temperature measurement unit. The acceleration-pedal measurement unit measures acceleration pedal input information (an acceleration pedal input value) in accordance with the driver's operation of the acceleration pedal. The speed measurement unit measures a speed of the vehicle drive system. The temperature measurement unit measures the temperature of the power electronic part.

The acceleration pedal detection unit here is a normal accelerator position sensor (APS) that is installed on the acceleration pedal and outputs an electric signal in accordance with a state of the driver's operation of the acceleration pedal. The speed measurement unit acquires information on the speed of the vehicle drive system. The information on the speed of the vehicle drive system is the speed of the vehicle drive system, an acceleration thereof, or both.

In addition, the speed thereof is a rotational speed (motor speed) of the motor driving the electric vehicle, that is, a drive motor 41, a rotation speed (driving wheel speed) of a driving wheel 43, or a rotational speed (drive shaft speed) of the drive shaft. In this case, the speed measurement unit is a resolver installed on the drive motor 41, a wheel speed sensor installed on the driving wheel 43, or a sensor sensing the drive shaft speed. The acceleration is obtained by differentiating a speed signal of the speed measurement unit or is an acceleration actual-measurement value sensed by the acceleration sensor, as the speed measurement unit.

The temperature measurement unit measures the temperature of the power electronic part. The temperature measurement unit is the temperature sensor sensing temperature of the power electronic part or the temperature sensor (water temperature sensor) sensing the temperature of the coolant for cooling the power electronic part. The power electronic part here is the drive motor 41 driving the electric vehicle, an inverter (not illustrated) for driving and controlling the drive motor 41, a battery (not illustrated) connected to the drive motor 41 through the inverter in a chargeable or dischargeable manner, any other power electronic part associated with the driving of the drive motor 41, or a drive system part.

According to the present disclosure, the vehicle driving information is used by a basic torque command generation unit 21 to generate the basic torque command and may further include a vehicle speed. In this case, although not illustrated in FIG. 2, the driving information measurement unit 12 may further include a vehicle speed measurement unit. The vehicle speed measurement unit measures current vehicle-traveling speed. The vehicle speed measurement unit may be configured to include the wheel speed sensor installed on the driving wheel 43 of the electric vehicle.

The first control unit 20 includes the basic torque command generation unit 21, the virtual effect implementation controller 22, and a final torque command generation unit 23. The basic torque command generation unit 21 determines and generates the basic torque command from the vehicle driving information. The virtual effect implementation controller 22 determines the characteristics of the virtual after-burn sound from the vehicle driving information that is the actual driving variable information or from the vehicle driving information and the virtual variable information, and generates and outputs the after-burn signal for generating the after-burn sound, according to the determined characteristics of the virtual after-burn sound. The final torque command generation unit 23 generates a final torque command from the basic torque command that is input by the basic torque command generation unit 21.

The basic torque command is the motor torque command determined and generated based on the vehicle driving information collected in the electric vehicle while the electric vehicle is traveling. The basic torque command generation unit 21 is a vehicle control unit (VCU) or a part thereof that generates the motor torque command based on the vehicle driving information in a normal electric vehicle.

In addition, the virtual effect implementation controller 22 is a control constituent element that performs overall control for the virtual sound output. According to the present disclosure, the virtual effect implementation controller 22 is a novel constituent that determines the characteristics of the virtual after-burn sound in order to output the virtual after-burn sound and generates and outputs the after-burn signal according to the determined characteristics. The virtual effect implementation controller 22 is additionally provided, as a part of the vehicle control unit, within the vehicle control unit, or is provided as a control constituent element separately from the vehicle control unit.

The virtual effect implementation controller 22 determines the characteristics of the virtual after-burn sound based on the vehicle driving information that is the actual driving variable information in the electric vehicle, or determines the characteristics of the virtual after-burn sound from the virtual variable information acquired from the actual driving variable information (step S2 in FIG. 3). In addition, the virtual effect implementation controller 22 determines the characteristics of the virtual after-burn sound and then generates and outputs the after-burn signal according to the determined characteristics of the virtual after-burn sound (step S2 in FIG. 3).

Additionally, in order to produce the illusion of a virtual vehicle vibration resulting from after-burn using a motor that is the drive apparatus 41 of the electric vehicle, the virtual effect implementation controller 22 is provided in such a manner as to determine an intervention torque command for implementing a virtual after-burn effect, which is a correction torque command for producing the virtual vehicle vibration. The intervention torque command for implementing the virtual after-burn effect, which is determined by the virtual effect implementation controller 22, is input into the final torque command generation unit 23 and is used to correct the basic torque command. In this case, the virtual effect implementation controller 22 is provided in such a manner as to determine the intervention torque command for implementing the virtual after-burn effect, from the determined characteristics of the virtual after-burn sound.

In the final torque command generation unit 23, the basic torque command, which is input from the basic torque command generation unit 21, is corrected with the correction torque command (the intervention torque command for implementing the virtual after-burn effect), which is input from the virtual effect implementation controller 22. When the correction is performed, the intervention torque command for implementing the virtual after-burn effect, which is the correction torque command, is added to the basic torque command, and thus the final torque command is calculated.

The second control unit 30 is a control unit that receives the torque command transmitted from the first control unit 20, that is, the final torque command, which is output from the final torque command generation unit 23 of the first control unit 20, and controls the operation of the drive apparatus 41.

According to the present disclosure, the drive apparatus 41 is a motor connected to the driving wheel 43 of the electric vehicle to drive the electric vehicle, that is, the drive motor 41, and the second control unit 30 is a well-known motor control unit (MCU) that drives the drive motor 41 through the inverter in the normal electric vehicle and controls the driving of the drive motor 41.

According to the present disclosure, the intervention torque command for implementing the virtual after-burn effect is for providing a vibration for producing the illusion of virtual after-burn, to a torque of the motor that is the drive apparatus 41, and is for producing the illusion of a micro-vibration of the motor torque matched with the characteristics of the virtual after-burn sound.

The intervention torque command for implementing the virtual after-burn effect has a command value that varies in the form of a wave with predetermined frequency and amplitude. Alternatively, the intervention torque command for implementing the virtual after-burn effect has a command value that varies with the characteristics of the virtual after-burn sound. For example, the intervention torque command for implementing the virtual after-burn effect has a command value in the form of a pulse that corresponds to the intensity, a frequency, a duration time, and a time interval, of the virtual after-burn sound, which are among the characteristics of the virtual after-burn sound.

According to an embodiment of the present disclosure, a torque or rotational force that is output by the motor that is the drive apparatus 41, as illustrated in FIG. 2, is decelerated by a decelerator 42, and then the resulting torque or rotational force is transferred to the driving wheel 43. When the driving of the drive motor 41 is controlled according to the final torque command that results from performing the correction with the intervention torque command for implementing the virtual after-burn effect, the motor torque to which the micro-vibration for simulating vibration produced when the virtual after-burn occurs is added is output.

As illustrated in FIG. 3, the virtual effect implementation controller 22 determines the characteristics of the virtual after-burn sound (step S2 in FIG. 3), and then generates and outputs the after-burn signal according to the determined characteristics of the virtual after-burn sound (step S2 in FIG. 3). Subsequently, the operation of the audio device is controlled with the after-burn signal in a state where the sound generator 51, the amplifier 52, and the speaker 53 operate normally. Thus, the after-burn sound is output through the audio device (steps S3 and S4 in FIG. 3).

According to an embodiment of the present disclosure, the characteristics of the virtual after-burn sound includes at least one or more of an outward emittance point in time, the intensity, a duration time, a time interval, a frequency band, and a pitch (the degree of highness or lowness of tone). At the outward emittance point in time, the virtual after-burn sound is output through the sound generator 51, the amplifier 52, and the speaker 53. The intensity, the duration time, the time interval, and the frequency band or the pitch are those of the virtual after-burn sound.

Reference numeral 54 in FIG. 2 depicts a cluster installed in front of the driver's seat in the electric vehicle. Through the cluster 54, a current virtual engine speed and a current virtual gear position are displayed along with a current vehicle speed.

The configuration of the device for outputting the virtual after-burn sound is described above, taking the virtual after-burn sound as an example. According to the present disclosure, the virtual after-burn sound is only an example of the virtual sound that is intended to be provided. The present disclosure is not limited to providing the virtual after-burn sound. The virtual after-burn sound described above may be replaced with motor sound or engine sound.

In addition, the after-burn signal is described above as being used to output the virtual after-burn sound. However, the after-burn signal may be replaced with a vehicle-traveling signal that is used to output the virtual motor sound or the virtual engine sound. In this manner, according to the present disclosure, it is possible that the virtual motor sound or the virtual engine sound is provided instead of the virtual after-burn sound, and it is also possible that the virtual engine sound and the virtual after-burn sound are provided together.

According to the present disclosure, the after-burn signal and the vehicle-traveling signal are virtual effect signals that are used in the electric vehicle to generate and output the virtual sound, and are signal matched with the characteristics of the after-burn sound or characteristics of the virtual vehicle-traveling sound (the virtual engine sound or the virtual motor sound) under a current vehicle driving condition.

In this manner, when the control unit generates and outputs the virtual effect signal, such as an after-burn signal matched with the characteristics of the virtual after-burn sound, or the virtual effect signal, such as the vehicle-traveling signal matched with characteristics of the virtual vehicle-traveling sound, based on the driving variable information (the vehicle driving information), the audio device outputs desired virtual after-burn sound or desired virtual vehicle-traveling sound using the sound source signal and the virtual effect signal.

The audio device modifies and adjusts the sound source signal in such a manner as to express the characteristics of the after-burn sound or the characteristics of the virtual vehicle-traveling sound. Subsequently, the audio device additionally adjusts the modified and adjusted sound source signal using setting information based on the preset vehicle rating and a sound correction algorithm. As a result, through the speaker 53 of the audio device, the virtual sound based on the vehicle rating, which corresponds to the current vehicle driving condition, is output.

A method of determining the characteristics of the virtual after-burn sound, a method of generating the after-burn signal, a method of outputting the virtual after-burn sound, and the like will be described in more detail below.

According to the present disclosure, the after-burn sound that is generated in a high-performance vehicle equipped with the internal combustion engine is virtually output in the electric vehicle, and thus the driver of the electric vehicle can realize a sporty feel. Furthermore, the driver can realize a sporty sensation.

In the internal combustion engine vehicle, the after-burn sound is sound that is generated by forcibly operating a fuel injection cylinder and adjusting ignition timing. According to the present disclosure, the after-burn signal is for generating in the electric vehicle the after-burn sound that is generated in the internal combustion engine vehicle through a single cylinder cut (SCC) logic for the internal combustion engine and the transmission. The SCC logic here is logic for injecting a very small amount of fuel into a cylinder of the engine and causing explosion in a rear end portion of an exhaust manifold during upshifting. Through the SCC logic, a delay in ignition and a change in an air-fuel ratio are caused to take place.

According to the present disclosure, the after-burn signal is a signal matched with the characteristics of the virtual after-burn sound described above and is generated for operating the audio device. The characteristics of the after-burn sound are basically determined using the actual driving variable information, or the actual driving variable information and the virtual variable information in the electric vehicle.

The actual driving variable information here includes the motor torque and the drive system speed, and the virtual variable information is the virtual engine speed. In addition, the drive system speed is the motor speed, the driving wheel speed, or the drive-shaft speed. In addition, according to the present disclosure, the characteristics of the virtual after-burn sound is determined based on the motor torque and the drive system speed or is determined based on the motor torque and the virtual engine speed.

The motor torque here is the motor torque command or is the basic torque command. In addition, instead of the motor torque, the acceleration pedal input value (APS value) may be used as the actual driving variable information for determining the characteristics of the virtual after-burn sound. In addition, a virtual gear shift signal that is obtained in the above-described control process for creating and experiencing the feeling of virtual gear shift may be used as the virtual variable information for determining the characteristics of the virtual after-burn sound.

Figure 4:
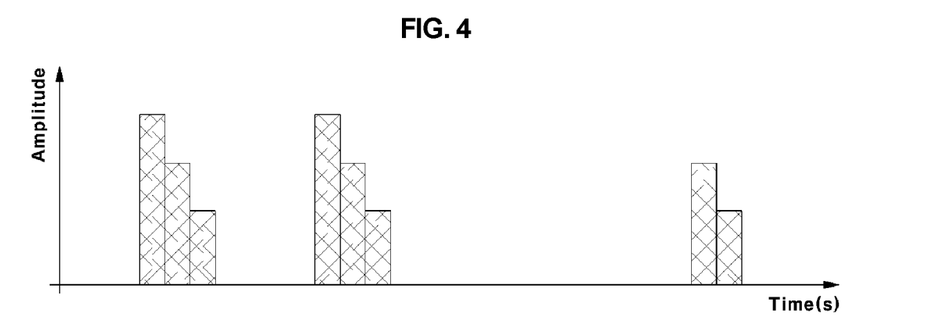
FIG. 4 is a flow illustrating characteristics of the virtual after-burn sound according to the present disclosure.

FIG. 4 illustrates the characteristics of the virtual after-burn sound according to the present disclosure. Specifically, FIG. 4 illustrates the outward emission point in time and the intensity (that is, a volume of the virtual after-burn sound) of the virtual after-burn sound among the characteristics of the virtual after-burn sound. According to the present disclosure, among the characteristics of the virtual after-burn sound, the outward emission point in time is an element by which a time when the virtual after-burn sound starts to be output is determined.

The outward emittance point in time is determined from the acceleration pedal input value (APS value), which is included in the actual driving variable information and measured by the acceleration-pedal measurement unit of the driving information measurement unit 12. Alternatively, the outward emittance point in time is determined using the motor torque or the temperature of the power electronic part. For example, it is determined that the outward emission point in time is reached, when a change takes place from an APS application state where the driver keeps stepping on the acceleration pedal to an APS non-application state where the driver does not keep stepping on the acceleration pedal, or when the acceleration pedal input value changes from a value higher than a preset value to a value equal to or lower than the preset value. Alternatively, it is determined that the outward emission point in time is reached, when the motor torque changes from a positive value to zero or a negative value, or when the temperature of the power electronic part (which may be the temperature of the coolant), such as the temperature of the motor or the temperature of the battery, falls within a preset range of conditions for the outward emission.

In addition, as the drive system speed or the virtual engine speed has a higher value, the intensity (the volume of sound) of the virtual after-burn sound, among the characteristics of the virtual after-burn sound, is determined to have a lower value. The reason for this is that the intensity of the after-burn increases when the transmission is in a low gear in the internal combustion engine vehicle. Conversely, as the drive system speed or the virtual engine speed has a higher value, the intensity of the virtual after-burn sound may be determined to have a higher value. Alternatively, as an acceleration value calculated by differentiating the speed signal or acquired from a signal of the acceleration sensor becomes higher, the intensity of the virtual after-burn sound is set to have a higher value. Furthermore, as an integral value of the acceleration becomes higher, the intensity is set to have a higher value.

In addition, as the acceleration pedal input value (APS value) becomes higher, the intensity of the virtual after-burn sound is determined to have a higher value. Furthermore, as a gradient of the decreasing acceleration pedal input value becomes larger, and as the integral value of the acceleration pedal input value becomes higher, the intensity of the virtual after-burn sound is determined to have a higher value. In addition, as the motor torque becomes higher, the intensity is determined to have a higher value. Furthermore, as a gradient of the decreasing motor torque becomes larger, the intensity is determined to have a higher value. In addition, the intensity is set to have a higher value when the temperature of the power electronic part falls within a predetermined setting range than when the temperature of the power electronic part falls outside of the predetermined setting range.

When a virtual after-burn effect is emitted outward in the form of audio, a frequency (the number of times in a second that any regular vibration is repeated), a frequency band, or a pitch (the degree of highness or lowness of tone) is adjusted. It is possible that, with the same matching method, the frequency is set for each of the same input variables that are used for the above-described intensity setting.

In addition, the duration time for which the virtual after-burn sound continues to be output is set. It is possible that, with the same matching method, the duration time is set for each of the same input variables that are used for the above-described intensity setting.

Generally, the after-burn sound is generated simultaneously and continuously, in the form of being impulsive, for a predetermined duration time. At this time, the time interval at which the after-burn sound is generated successively is set. It is also possible that, with the same matching method, the time interval is set for each of the same input variables that are used for the above-described intensity setting.

Figure 5:
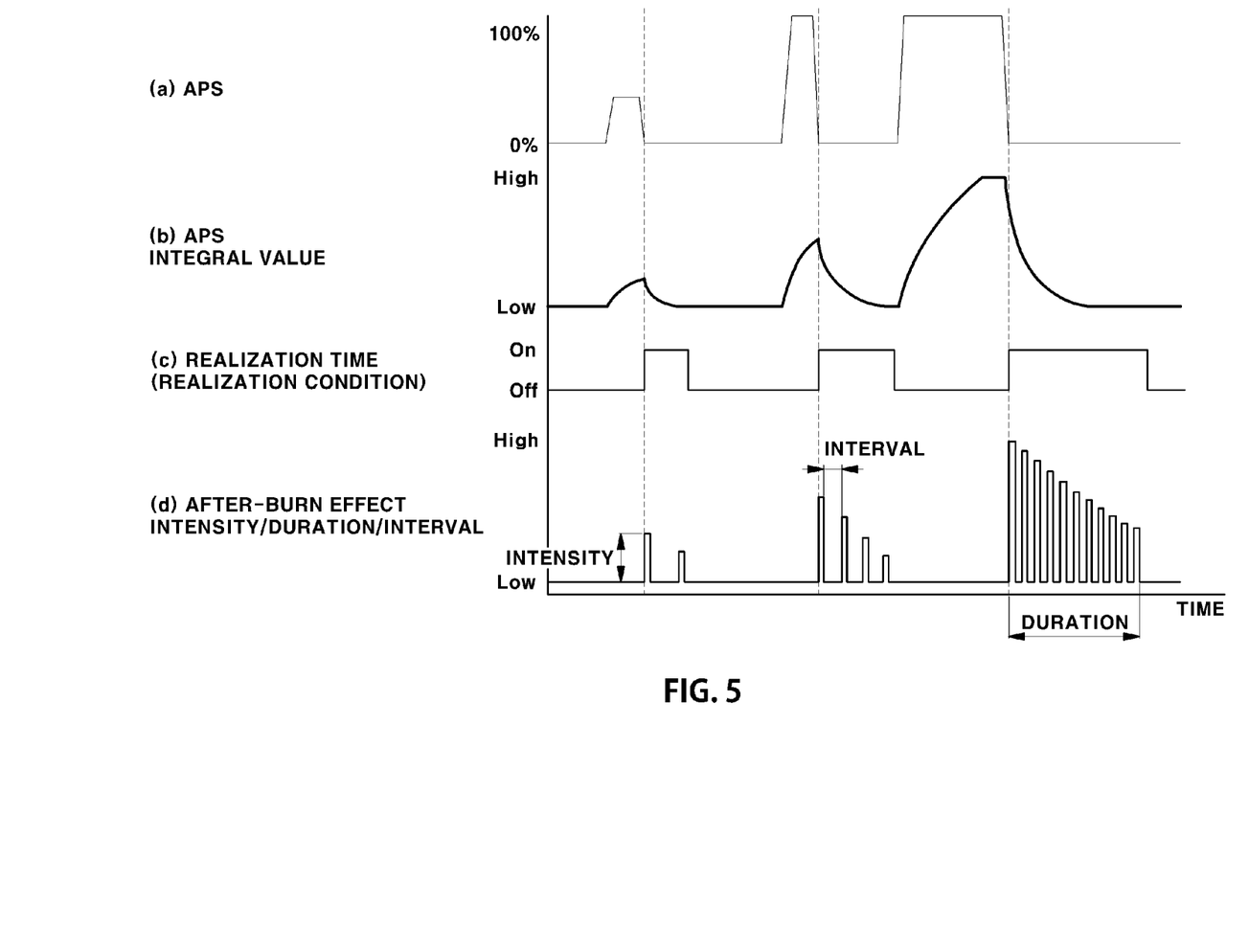
FIG. 5 is a view illustrating the characteristics of the virtual after-burn sound, which are determined with an acceleration pedal input value (APS value) and an integral value thereof according to an embodiment of the present disclosure.

FIG. 5 is a view illustrating the characteristics of the virtual after-burn sound, which are determined with the acceleration pedal input value (APS value) and the integral value thereof according to an embodiment of the present disclosure. FIG. 5 illustrates examples of an outward emission point in time, an intensity, a duration time, and a time interval of the virtual after-burn sound. In FIGS. 4 and 5, a value of amplitude on the Y-axis represents the intensity (the volume of sound) of the virtual after-burn sound, and a value on the X-axis represents the outward emission point in time at which the virtual after-burn sound is output and the duration time for which the virtual after-burn sound continues to be output. The characteristics of the virtual after-burn sound, which are illustrated in FIGS. 4 and 5, are exemplary, and do not impose any limitation on the present disclosure. It is possible that the outward emission point in time, the intensity, the duration time, the time interval, and the like are changed variously.

Figure 6:
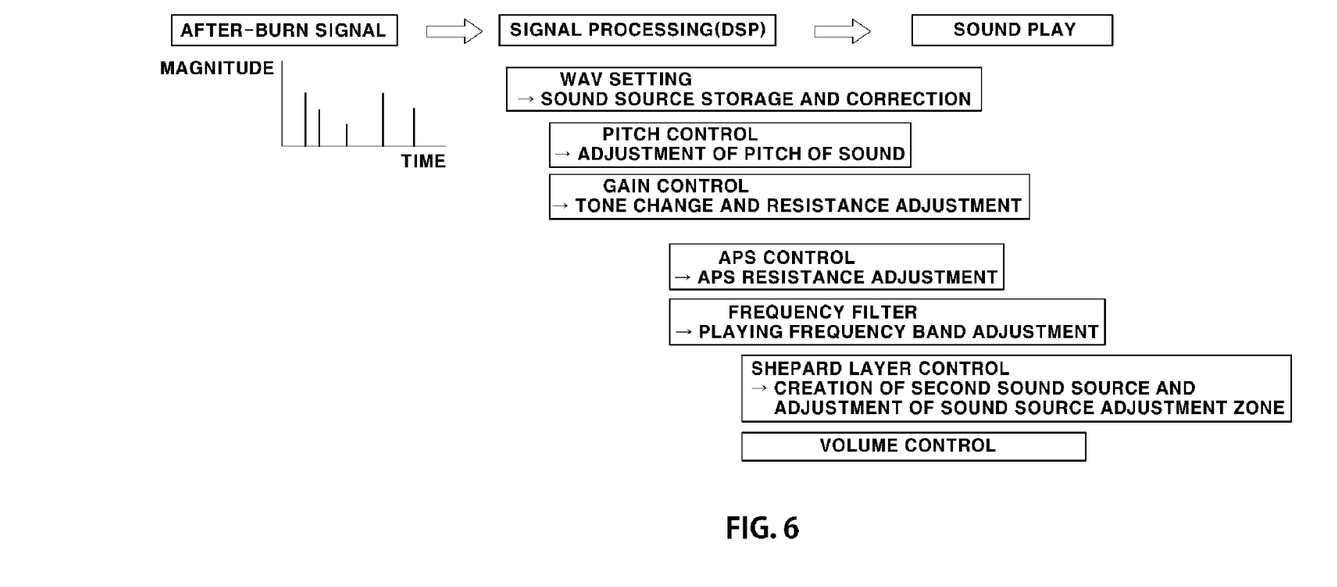
FIG. 6 is a view illustrating an after-burn signal and a sound generation process in accordance with the characteristics of the virtual after-burn sound according to an embodiment of the present disclosure.

FIG. 6 is a view illustrating an after-burn signal and a sound generation process in accordance with the characteristics of the virtual after-burn sound according to an embodiment of the present disclosure. As described above, after the characteristics of the virtual after-burn sound are determined, the after-burn signal matched with the determined characteristics of the virtual after-burn sound is generated. An example of the after-burn signal is illustrated on the left side of FIG. 6. As described above, the virtual effect implementation controller 22 generates and outputs the after-burn signal matched with the characteristics of the virtual after-burn sound, and the after-burn signal is transferred to the sound generator 51 of the audio device.

The sound generator 51 is one of the principal constituents for reproducing a sound source, and includes a digital signal processor (DSP). The after-burn signal is used to modify and adjust the sound source signal of the virtual after-burn sound. The digital processor (DSP) of the sound generator 51 performs conversion and processing on the sound source signal and the after-burn signal, which are input through a sound source input terminal, under the control of a CPU. In addition, the sound signal that is generated as a result of processing the sound source signal and the after-burn signal in the digital signal processor is amplified through the amplifier 52 and then the resulting sound signal is output to the speaker 53.

Generally, the after-burn sound in the high-performance vehicle equipped with the internal combustion engine is generated through the exhaust system. According to the present disclosure, in a similar manner in the high-performance vehicle equipped with the internal combustion engine, the virtual after-burn sound is reproduced in the electric vehicle in a manner that is output to inside and outside the electric vehicle. Thus, the drive can realize the same sporty feel as in the internal combustion engine vehicle.

According to an embodiment of the present disclosure, the virtual effect implementation controller 22 is provided in such a manner that the vehicle-traveling signal for reproducing the virtual vehicle-traveling sound, that is, the virtual engine sound or the virtual motor sound, is generated based on current actual vehicle driving information (the driving variable information) collected in the electric vehicle, separately from the after-burn sound, and in such a manner that the generated vehicle-traveling signal is then transferred to the sound generator 51 separately from the after-burn signal.

In this case, the virtual vehicle-traveling sound matched with the virtual effect signal is set to be reproduced and output through one or more speakers 53 installed inside the electric vehicle. In addition, the after-burn sound matched with the after-burn signal, as well as the vehicle-traveling sound matched with the vehicle-traveling signal, is set to be reproduced and output through one or more speaker 53 installed outside the electric vehicle. At this point, among the speakers 53 installed in a forward-backward direction outside the electric vehicle, the virtual after-burn sound is set to be reproduced and output through the speaker 53 installed on the rear side of the electric vehicle, and the virtual engine sound is set to be reproduced and output through the speaker 53 installed on the front side of the electric vehicle. Alternatively, the after-burn sound is also set to be reproduced and output through the speakers 53 installed inside the electric vehicle.

In the digital signal processor (DSP) of the sound generator 51, the sound source signal (WAV and the like) is stored and modified, and the pitch of sound (the degree of highness or lowness of tone) is adjusted. Furthermore, through gain control, the sound tone is changed, and resistance is adjusted. In addition, APS resistance is adjusted through APS control, and a frequency band for reproduction is adjusted through a frequency filter. In addition, through shepard layer control, the second sound source is generated, and a sound source adjustment region is adjusted. In addition, a volume of each of the virtual after-burn sound and the vehicle-traveling sound is adjusted.

According to an embodiment of the present disclosure, when the virtual sound, that is, the virtual after-burn sound or the virtual vehicle-traveling sound (the virtual motor sound or the virtual engine sound), which is described above, is reproduced and output, the audio device additionally processes and modifies the sound signal that is generated using the sound source signal or the virtual effect signal (the after-burn signal or the vehicle-traveling signal), and thus generates the sound signal differentiated based on the vehicle rating.

Figure 7:
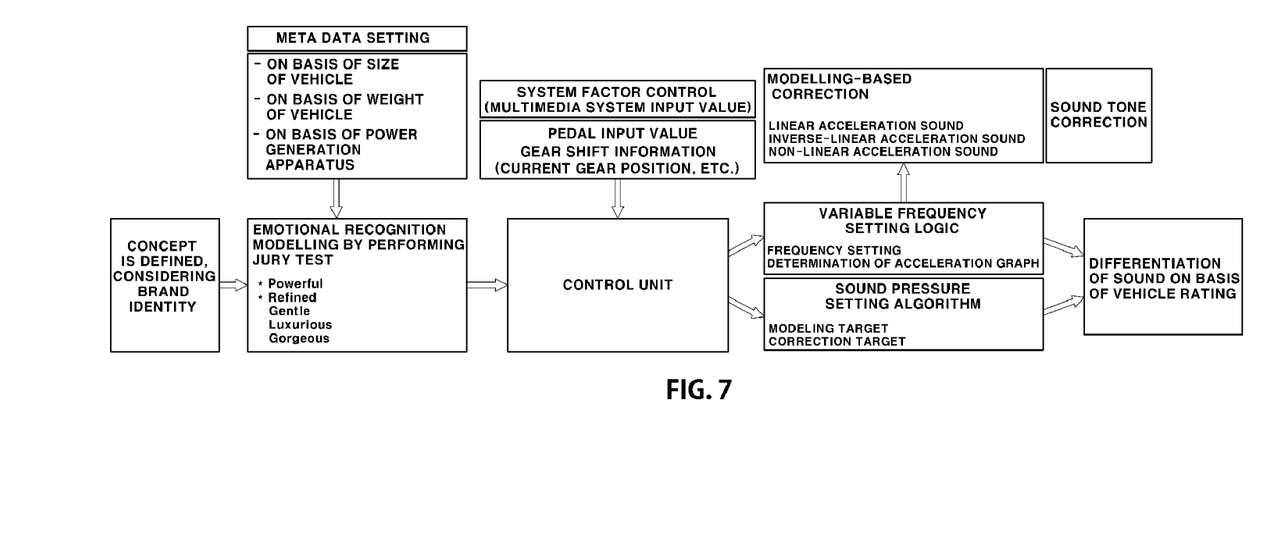
FIG. 7 is a block diagram illustrating an entire process of correcting virtual sound based on vehicle rating according to an embodiment of the present disclosure.

That is, when the control unit (the virtual effect implementation controller of the first control unit 20) generates and outputs the after-burn signal or the vehicle-traveling signal, the sound generator 51 of the audio device receives the after-burn signal or the vehicle-traveling signal, processes the received after-burn signal or vehicle-traveling signal, along with the sound source signal, and generates the sound signal in accordance with the vehicle driving condition Subsequently, the sound generator 51 adjusts and processes the sound signal according to the preset sound correction algorithm and generates a final sound signal differentiated based on the vehicle rating. Accordingly, the audio device outputs the virtual sound (the virtual after-burn sound, the virtual vehicle-traveling sound, or the virtual after-burn sound and the virtual vehicle-traveling sound) differentiated based on vehicle rating according to the generated final sound signal.

The setting information based on the vehicle rating, which is obtained in an electric vehicle development stage, and the sound correction algorithm that uses the setting information based on the vehicle rating are stored in advance in the sound generator 51 of the electric vehicle that is manufactured in mass production, in such a manner that the virtual sound differentiated based on the vehicle rating is output in this manner. Accordingly, when the driver selects the desired vehicle rating through the interface unit 11 in the electric vehicle manufactured in mass production, the driver corrects the sound signal through the sound generator 51 of the audio device using the setting information based on the vehicle rating corresponding to the selected vehicle rating, and the sound correction algorithm, and outputs the virtual sound differentiated based on the vehicle rating according to the final sound signal resulting from the correction.

The setting information based on the vehicle rating and the sound correction algorithm, which are obtained in the electric vehicle development stage, are stored in the electric vehicle manufactured in mass production and are used in this manner. To this end, a concept is defined, considering a brand identity (for example, HYUNDAI MOTOR COMPANY, KIA MOTORS CORPORATION, or GENESIS) of a vehicle model that is used by a vehicle manufacturing company. Then, optimal sound based on the vehicle rating is evaluated and selected by performing an emotional recognition modeling process that performs JURY TEST or the like. Thus, the setting information based on the vehicle rating and the sound correction algorithm that are capable of generating optimal sound are obtained.

In the emotional recognition modeling process, sound based on the vehicle rating, which is capable of expressing and providing emotion represented by the expression "Powerful", "Refined", "Gentle", "Luxurious", "Gorgeous" or the like, which is classified based on the vehicle ratings is evaluated and then is selected or modified. Then, the sound signal is corrected based on the vehicle rating. Lastly, the setting information based on the vehicle rating and the sound correction algorithm for generating the final sound signal are set.

In addition, it is possible that an average value of the sound based on the vehicle rating, which is measured through a self-test and evaluation method, is analyzed in the electric vehicle development stage. Thus, it is possible that the result of the analysis is utilized when setting the setting information based on the vehicle rating and the sound correction algorithm. In this case, sound pressure weighting or reference sound pressure for the sound based on the vehicle rating is set as the setting information based on the vehicle rating. The sound pressure weighting or the reference sound pressure is obtained by analyzing the average value of the sound based on the vehicle rating, which is measured through the self-test and evaluation method. In addition, the setting information based on the vehicle rating, such as the order and frequency band of the virtual sound based on the vehicle rating and a variable frequency based on the number of cylinders, is obtained according to the number of cylinders of an engine that needs to be simulated. The setting of the variable frequency based on the number of cylinders is information that is obtained by specifying the vehicle rating (a light-weight, small-sized, medium-sized, or large-sized vehicle) through a power generation apparatus. The order of the virtual sound and the frequency band are determined in a manner that varies according to the number of cylinders.

A bandwidth of a frequency of a pulse that is generated according to an rpm of the engine is defined as the order. The order and the frequency band each are differentiated, and thus it is possible that the sound is differentiated based on the vehicle rating. A reference that is used to set the variable frequency based on the number of cylinders is determined by generalizing characteristics of variable frequencies of pulses that are generated according to the numbers of cylinders of engines of electric vehicles in states where the electric vehicles are traveling. With this reference, the variable frequency differentiated based on the number of cylinders is set, tuning based on the number of cylinders is performed through the sound correction algorithm, and sound that results from the correction is generated and reproduced.

According to the present disclosure, the vehicle rating is a vehicle grade that is normally classified by a well-known method in the art. Specifically, the vehicle rating means a vehicle grade that is arbitrarily classified and defined based on at least one of the size and weight of the vehicle, the size and output capacity of the power generation apparatus, the number of cylinders and displacement of the engine, or the presence or absence of the turbocharger. In particular, the electric vehicles are categorized into large-sized, medium-sized, and small-sized ones. Additionally, it is possible that the electric vehicles are selectively categorized into luxury vehicles, light-weight vehicle, quasi-large-sized vehicles, and quasi-medium-sized vehicles.

According to the present disclosure, the setting information based on the vehicle rating includes information based on the vehicle rating and the setting information for correction based on the vehicle rating. The information based on the vehicle rating, for example, is a type of electric vehicle, such as a large-sized electric vehicle, a medium-sized electric vehicle, a small-sized electric vehicle, a luxury electric vehicle, a light-weight electric vehicle, a quasi-large-sized electric vehicle, or a quasi-medium-sized electric vehicle, that results from the categorization according to the size and weight of the electric vehicle, the size and output capacity of the power generation apparatus, the number of cylinders and displacement of the engine, and the presence or absence of the turbocharger.

Accordingly, when the driver selects the vehicle rating through the interface unit 11, the audio device adjusts the sound pressure and the frequency of the sound signal using the setting information corresponding to the selected vehicle rating and the sound correction algorithm, and outputs the virtual sound differentiated based on the vehicle rating using the adjusted sound signal as the final sound signal.

In addition, according to the present disclosure, the virtual sound additionally adjusted according to a value that is set by the driver operating the interface unit 11 is set to be finally output through the speaker 53. The interface unit 11 here may be an operation unit of a multimedia system (AVN system) installed in the electric vehicle. The operating of the interface unit 11 includes at least one of audio volume adjustment or sound tone adjustment.

In this manner, according to the present disclosure, the virtual sound is output and provided in such a manner that the driver can realize a sporty feel and have various types of driving fun in the electric vehicle. In addition, in the same manner as the after-burn sound in the internal combustion engine vehicle, sound generated in a drive system other than the electric vehicle drive system is virtually output and provided in the electric vehicle. In addition, the virtual sound differentiated based on the vehicle rating is provided in the electric vehicle.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of providing virtual sound in an electric vehicle, the method comprising:
    collecting, by a control unit, vehicle driving information for outputting the virtual sound, while the electric vehicle is traveling, wherein the vehicle driving information includes a temperature of a power electronic part;
    determining, by the control unit, characteristics of the virtual sound based on the collected vehicle driving information, wherein the characteristics of the virtual sound comprise an outward emission point in time that is a point in time at which the virtual output by the audio device;
    determining, by the control unit, the outward emission point is reached when the temperature of the power electric part falls within a preset range,
    generating, by the control unit, a virtual effect signal for outputting the virtual sound, based on information on the determined characteristics of the virtual sound;
    generating, by an audio device, a sound signal containing the characteristics of the virtual sound, based on the virtual effect signal that is input from the control unit;
    correcting, by the audio device, the generated sound signal to obtain a final sound signal corresponding to a vehicle rating that is selected by a driver according to setting information based on a preset vehicle rating and a sound correction algorithm; and
    outputting, by the audio device, the virtual sound corresponding to the selected vehicle rating, according to the final sound signal resulting from the correction.

2. The method of claim 1, wherein the virtual sound is a virtual after-burn sound that results from simulating an after-burn sound generated in an exhaust system of an internal combustion engine vehicle.

3. The method of claim 1, wherein the virtual sound is virtual engine sound or virtual motor sound.

4. The method of claim 1, wherein the virtual sound comprises a virtual after-burn sound that results from simulating an after-burn sound generated in an exhaust system of an internal combustion engine vehicle, and a virtual engine sound that results from simulating engine sound of the internal combustion engine vehicle,
    wherein the virtual after-burn sound is output through a speaker installed on a rear side of the electric vehicle and the virtual engine sound is output through a speaker installed on a front side of the electric vehicle.

5. The method of claim 1, wherein the characteristics of the virtual sound further comprise:
    at least one of intensity, a duration time, a time interval, a frequency band, or a pitch indicating a degree of highness or lowness of tone, of the virtual sound.

6. The method of claim 1, wherein the vehicle driving information further comprises at least one of an acceleration pedal input value that is input by the driver, a motor torque command, and drive system speed information.

7. The method of claim 1, wherein the vehicle rating is a vehicle grade that is classified and defined based on at least one of a size and weight of a vehicle, a size and output capacity of a power generation apparatus, a number of cylinders and displacement of an engine, or the presence or absence of a turbocharger.

8. The method of claim 1, wherein in correcting the generated sound signal to obtain the final sound signal corresponding to the vehicle rating, a frequency and sound pressure of a pre-correction sound signal are adjusted and thus corrected according to the setting information based on the vehicle rating and the sound correction algorithm.

9. The method of claim 1, wherein the vehicle rating is selected and input by the driver through an interface unit connected to the audio device in the electric vehicle.

10. The method of claim 1, wherein in outputting the virtual sound, the virtual sound adjusted according to a value that is set by operating an interface unit connected to the audio device is output.

11. The method of claim 10, wherein operating the interface unit comprises at least one of audio volume adjustment or sound tone adjustment.

* * * * *